United States Patent [19]
Takaki et al.

[11] Patent Number: 5,934,101
[45] Date of Patent: Aug. 10, 1999

[54] COMPRESSION ABSORPTION HEAT PUMP

[75] Inventors: Tsuneo Takaki; Mitsuaki Kanetsuki; Akira Ochikubo, all of Hiroshima; Hajime Endou; Yoshinori Nagashima, both of Tokyo, all of Japan

[73] Assignees: The Chugoku Electric Power Co., Inc., Hiroshima; Mitsui Engineering & Shipbuilding Co., Ltd., Tokyo, both of Japan

[21] Appl. No.: 08/973,395

[22] PCT Filed: Apr. 23, 1997

[86] PCT No.: PCT/JP97/01400

§ 371 Date: Dec. 11, 1997

§ 102(e) Date: Dec. 11, 1997

[87] PCT Pub. No.: WO97/40327

PCT Pub. Date: Oct. 30, 1997

[30] Foreign Application Priority Data

Apr. 25, 1996 [JP] Japan .................................. 8-105566

[51] Int. Cl.$^6$ ...................................................... F25B 15/00
[52] U.S. Cl. ............................................ 62/483; 62/476
[58] Field of Search .............................. 62/101, 476, 483, 62/335

[56] References Cited

U.S. PATENT DOCUMENTS

| 4,031,712 | 6/1977 | Costello | 62/483 |
| 4,171,619 | 10/1979 | Clark | 62/2 |
| 4,586,344 | 5/1986 | Lutz et al. | 62/101 |
| 5,038,574 | 8/1991 | Osborne | 62/101 |

FOREIGN PATENT DOCUMENTS

| 4-151468 | 5/1992 | Japan . |
| 60-20064 | 2/1995 | Japan . |

Primary Examiner—William Doerrler
Attorney, Agent, or Firm—Nikaido, Marmelstein, Murray & Oram LLP

[57] ABSTRACT

The condensed water, as condensed by applying the VRC to a regeneration process, and the strong solution, as fed out of a regenerator, are employed as a heat source to preheat a weak solution so that the preheating amount of the weak solution is increased to improve the performance coefficient of a heat pump. At a heating time, moreover, the solution concentration is raised by utilizing the cooling heat of the absorbent liquid for the hating operations and by reserving a portion of the regenerated refrigerant liquid, thereby to provide a heat pump for the cooling/heating operations

2 Claims, 5 Drawing Sheets

COMPRESSION ABSORPTION HEAT PUMP

TECHNICAL FIELD

The present invention relates to a compression/absorption hybrid heat pump and, more particularly, to a compression/absorption hybrid heat pump employing water, ammonia or the like as its refrigerant and a solution, e.g., lithium bromide (LiBr) or water as its absorbent, and comprising an evaporator, an absorber, a solution heat exchanger, a regenerator and a compressor as its major components. This compression/absorption hybrid heat pump is used as a freezing or heating apparatus for air conditioning (cooling/heating) operations and for chemical processes.

BACKGROUND ART

As a working medium for an absorption refrigerating machine, there are not only a combination of water acting as a refrigerant and an aqueous solution of LiBr as an absorbent but also combinations of ammonia and water, HFC22 and E181 and others.

On the other hand, there are also a variety of systems in the compression/absorption hybrid heat pump in which the absorption refrigerating machine is combined with a compressor. The invention relates to a compression/absorption hybrid heat pump in which the refrigerant vapor, as generated by a regenerator, is compressed by a compressor so that the compressed vapor is used as a regenerative heat source for the absorbent solution, and in which the VRC (=Vapor Re-Compression) is applied to the regenerator. Here, this VRC is also called the "MVR (=Mechanical Vapor Re-Compression)".

DISCLOSURE OF INVENTION

The invention relates to a compression/absorption hybrid heat pump in which the VRC is combined with the regeneration process of the absorption refrigerating machine More particularly, a heat source for a regeneration process is prepared by compressing the vapor, which is generated at a regenerating (or condensing) step of a regenerator by a compressor, and by introducing the compressed vapor again into the regenerator to exchange the heat as the reproduction heat source with a weak solution.

This compression/absorption hybrid heat pump has been proposed for a long time. Since the flow rate of the strong solution is lower in the solution heat exchanger than that of the weak solution, the weak solution cannot be sufficiently preheated to make it necessary either to provide an auxiliary preheater or to increase the heating capacity in the regenerator When the water is employed as the refrigerant whereas LiBr is employed as the absorbent, moreover, the absorption refrigerating machine usually acts under a low pressure so that the water vapor has a low density. In order to combine this the compressor with this, a large-sized compressor is required.

Since the cooling water temperature is limited, moreover, the heat of the absorber is difficult to use for the heating operations so that it can be applied only to a cooling cycle.

Because of these problems, the mere combination of the compression type heat pump with the absorption refrigerating machine of the prior art could not increase the performance coefficient. For the complicated structure, little effect is achieved from the hybrid so that no practiced example has been found.

According to a first feature of the invention, the condensed water, as condensed by applying the VRC to a regeneration process, and the strong solution, as fed out of a regenerator, are employed as a heat source to preheat a weak solution so that the preheating amount of the weak solution is increased to improve the performance coefficient of a refrigerating machine. In the invention, more specifically, not only the strong solution fed out of the regenerator but also the condensed liquid of the vapor used as the heat source in the regenerator is employed as the heat source for preheating the weak solution in the solution heat exchanger. As a result, the preheated temperature of the weak solution is raised to reduce the heating in the auxiliary preheater or the regenerator so that the performance coefficient of the compression/absorption hybrid refrigerating machine is increased.

According to a second feature of the invention, moreover, in order to suppress the increase in the size of the compressor, the regenerative pressure is raised to the atmospheric or higher level to increase the density of the regenerated vapor.

According to a third feature of the invention, sill moreover, in order to effect both the cooling and heating operations, the density of the solution is varied between the cooling and warming operations.

BEST MODE FOR CARRYING OUT THE INVENTION

A compression/absorption hybrid heat pump of the prior art will be described prior to the description of the modes of embodiment of the invention.

Figure 9:
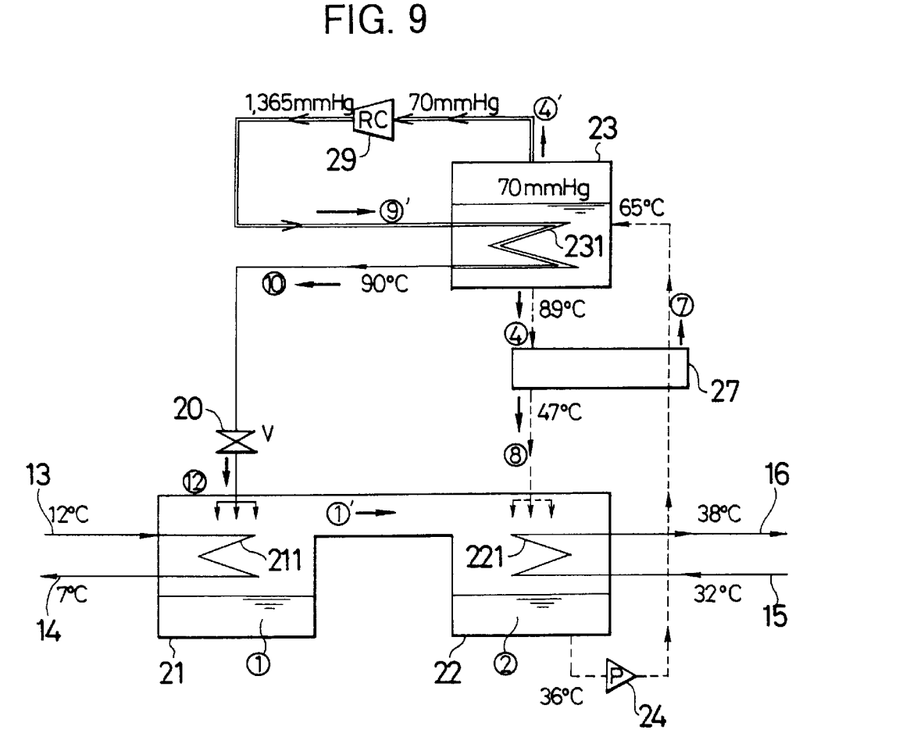
FIG. 9 is a process flow chart of a compression/absorption hybrid heat pump of the prior art.
Figure 10:
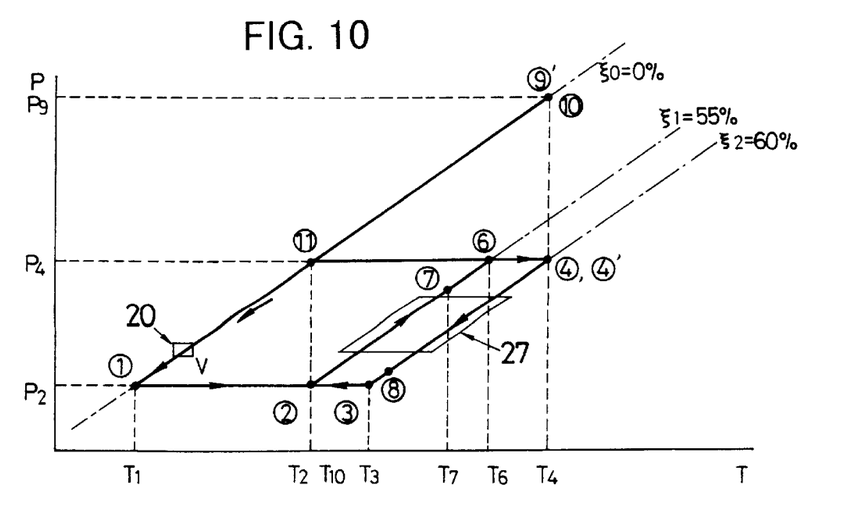
FIG. 10 is a cycle diagram of the compression/absorption hybrid heat pump of the prior art.

FIGS. 9 and 10 are a process flow diagram and a cycle diagram (a Duehring diagram) of a compression/absorption hybrid heat pump in which the VRC is simply applied to the single-purpose absorption refrigerating machine of the prior art employing water as its refrigerant and an aqueous solution of LiBr as its absorbent for one example of the prior art.

FIG. 9 presents a process flow and a state of a solution (in terms of temperature and pressure) in a compression/ absorption hybrid heat pump. FIG. 10 presents a cycle diagram (or a Duehring diagram) of the same, and letter ξ designates the concentration of the solution. Here: $ξ_0$ designates the zero concentration, i.e., the state of pure water; $ξ_1$ designates the concentration of a weak solution; and $ξ_2$ designates the concentration of a strong solution.

In an evaporator 21, as shown in FIG. 9, a water refrigerant 12 exchanges the heat on the surface of a heat exchanging portion 211 with cold water 13 fed to the evaporator 21 so that it evaporates. As a result, the cold water 14 thus lowered in temperature is delivered to an application (not-shown).

In an absorber 22, on the other hand, a strong solution 8 flows on the surface of a heat exchanging portion 221 and absorbs vapor 1' generated by the evaporator 21 so that the solution has its concentration lowered to become a weak solution 2. In order that the solution may absorb the vapor at this time, the solution temperature has to be cooled to a predetermined or lower level, and the strong solution 8 is controlled to attain a predetermined temperature with cooling water 15 fed to the inside of the heat exchanging portion 221.

The weak solution 2 in the absorber 22 is pumped out by a solution pump 24 and then heated to a high temperature by a solution heat exchanger 27 and is fed to a regenerator 23. In this regenerator 23, the weak solution is heated/boiled with the vapor in a heat exchanging portion 231 so that only the water content in the solution is evaporated and generated. As a result, the solution has its concentration raised to become a strong solution 4.

In this regenerator 23, the weak solution 2 is heated/regenerated (or condensed) by compressing the evaporated water vapor 4' by a compressor 29, and by introducing the compressed vapor having a raised pressure into the heat exchanging portion 231 of the regenerator 23 to exchange the heat with the weak solution 2 in the regenerator 23.

In the regeneration process in the regenerator 23, the condensed solution, i.e., the strong solution 4 is delivered to the solution heat exchanger 27, in which it exchanges the heat with the weak solution 2 to have a lowered temperature, and is circulated to an absorber 22 as the low-temperature strong solution 8 so that it is used again for the absorption process. In the regenerator 23, on the other hand, the refrigerant vapor exchanges the heat with the weak solution and is condensed to become liquid water 10, which is circulated through an expansion valve 20 into the evaporator 21, and this cycle is repeated.

FIG. 10 illustrates the heat cycle of the flow of FIG. 9 in the Duehring diagram, and its description will be omitted because the reference numerals of two Figures are made to correspond to each other.

Figure 1:
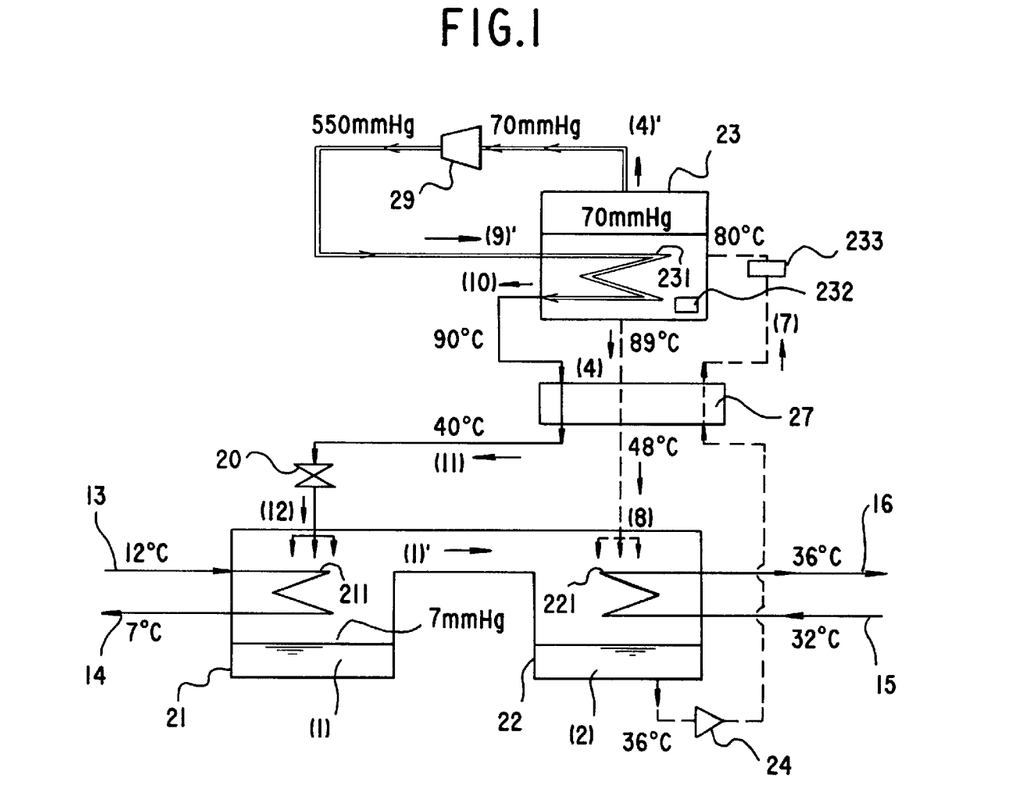
FIG. 1 is a process flow chart showing a first mode of embodiment of a compression/absorption hybrid heat pump according to the invention.
Figure 2:
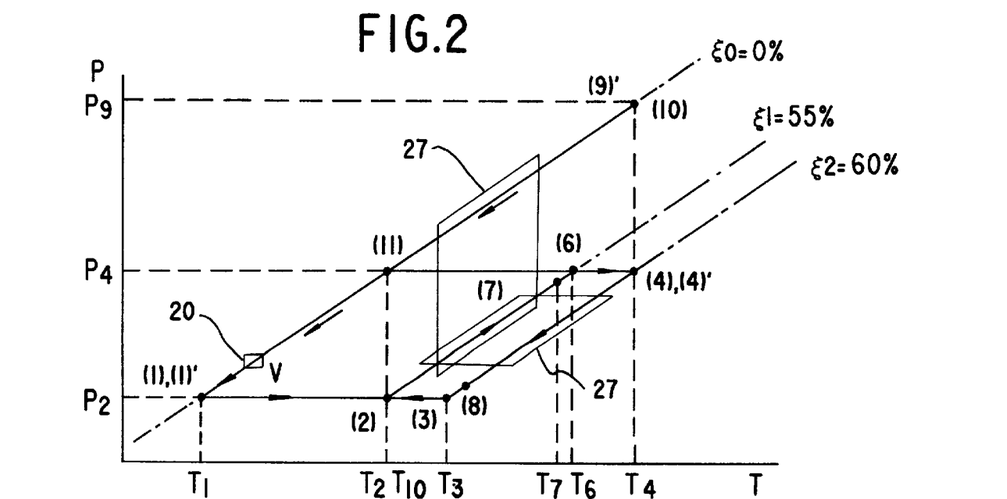
FIG. 2 is a cycle diagram of the compression/absorption hybrid heat pump shown in FIG. 1.

On the other hand, FIG. 1 is a schematic diagram showing a first mode of embodiment of the invention of a compression/absorption hybrid heat pump according to the invention, in which the single-purpose absorption refrigerating machine and the compressor are combined, and FIG. 2 is a cycle diagram (or a Duehring diagram) of the same.

In the individual refrigerating machines of FIGS. 1 to 4, FIG. 5 and FIG. 6, the same units as those of the prior art are designated by the common reference numerals. Moreover, the descriptions of the evaporation process and the absorption process are omitted because they are similar to those of the prior art.

The weak solution 2, as pumped out from the absorber 22 by the solution pump 24, is heated to temperatures $T_2$ to $T_7$, as illustrated in FIG. 2, in the solution heat exchanger 27 with the condensed water 10 as fed out of the regenerator 23 and the strong solution 4 fed out of the regenerator 23 and is fed out as a weak solution 7 into the regenerator 23.

In the regenerator 23, the weak solution 2 is heated/boiled to the temperatures $T_7$ to $T_4$ with the vapor in the heat exchanging portion 231 so that it is heated to a higher temperature while evaporating only the water content, until it is delivered as the strong solution 4 from the regenerator 23 to the liquid heat exchanger 27.

In the regenerator 23, the vapor 4', as evaporated from the weak solution, is delivered to the compressor 29, in which it is compressed. The vapor 9' thus compressed is delivered again to the regenerator 23, in which it exchanges heat and is condensed with the solution in the heat exchanging portion 231 in the regenerator 23. This condensed water 10 is fed to the solution heat exchanger 27.

Here in the regeneration process, in addition to the generation of water vapor, the solution rises in temperatures ($T_6$ to $T_4$), as illustrated in FIG. 2. As a result, the calorie, as required for the regeneration in the regenerator 23, is not only the calorie, as contained by the vapor generated at the aforementioned regeneration time, but also the calorie accompanying the temperature rise of the solution. For this requirement, either the (not-shown) auxiliary heating device is disposed in the regenerator, or the (not-shown) auxiliary preheater is interposed between the solution heat exchanger and the regenerator.

The strong solution 4, as fed to the solution heat exchanger 27, has a temperature lowered by the heat exchange with the weak solution 2 and is circulated as the low-temperature strong solution 8 to the absorber 22. Likewise, the condensed water 10, as fed to the solution heat exchanger 27, exchanges the heat with the weak solution 2 and circulates as low-temperature water 11 through the expansion valve 20 to the evaporator 21.

The heat source for preheating the weak solution 2 in the solution heat exchanger 27 uses two fluids, i.e., the condensed water 10 and the strong solution 4, as described above, so that the weak solution 2 can preheated as high as the regenerative temperature so that the heating capacity of the auxiliary preheater or the auxiliary heater in the regenerator can be reduced.

This raises the performance coefficient of the compression/absorption hybrid heat pump.

In the embodiment of the prior art shown in FIG. 9, more specifically, the weak solution to be delivered to the regenerator 23 is at a temperature of 65° C. because it is heated only with the strong solution 4 in the solution heat exchanger 27. In the mode of embodiment of the invention shown in FIG. 1, however, the weak solution 7 is heated to a temperature of 80° C. because it is heated not only with the strong solution 4 in the solution heat exchanger 27 but also with the condensed water 10.

In the regenerator 23, therefore, the auxiliary calorie necessary for the solution preheater or regenerator to generate 1 Kg of vapor is about 0.1 KW including the heat of evaporation in the prior art (as should be referred to FIG. 9), because the weak solution has to be heated from 65° C. to 89° C. In the invention (as should be referred to FIG. 1), however, the necessary auxiliary calorie is reduced to 0.01 KW because it is sufficient to heat the weak solution from 80° C. to 89° C. In these two cycles, the refrigerating output is 0.58 KW, and the compressor driving power is 0.140 KW for generating 1 Kg of vapor in the regenerator. As a result, the performance coefficient is substantially doubled from about 2 in the prior to about 4 in the invention.

Figure 3:
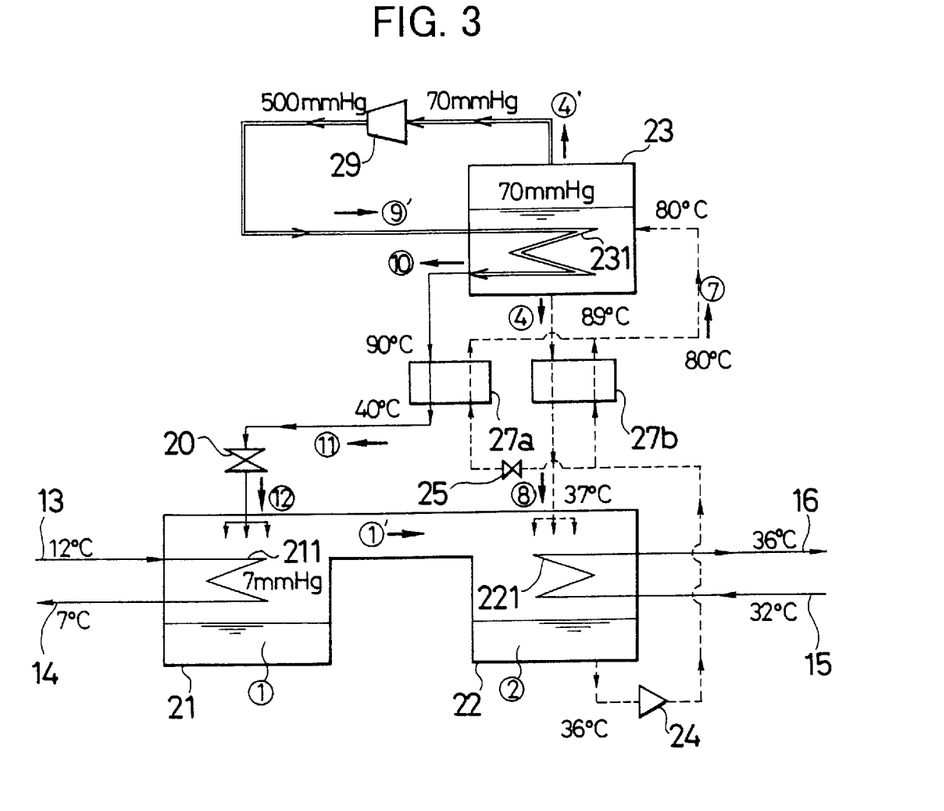
FIG. 3 is a process flow chart showing a second mode of embodiment of the compression/absorption hybrid heat pump according to the invention.
Figure 4:
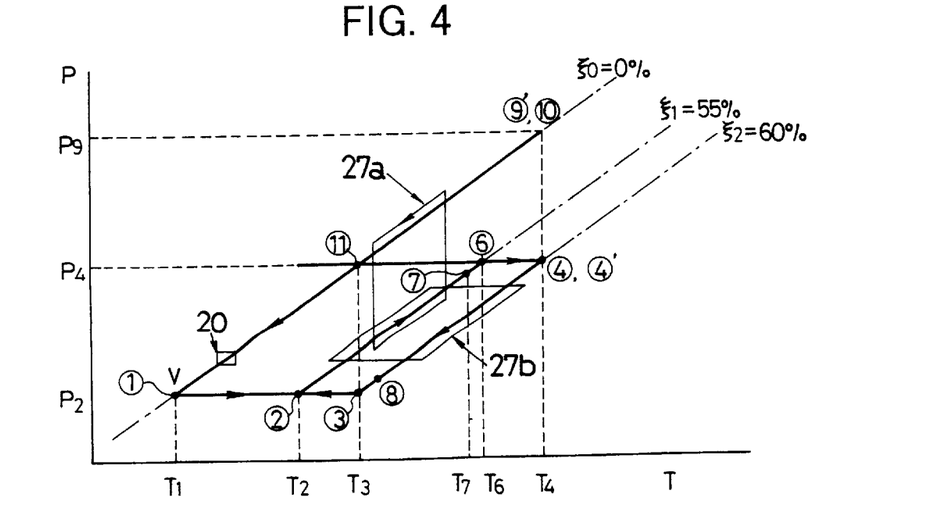
FIG. 4 is a cycle diagram of the compression/absorption hybrid heat pump shown in FIG. 3.

A second mode of embodiment of the invention is shown in FIGS. 3 and 4. In this mode, two solution heat exchangers are arranged in parallel to effect the respective heat exchanges of condensed water—weak solution and strong solution—weak solution. FIG. 3 presents a flow chart of the system, and FIG. 4 presents a cycle diagram (or a Duehring diagram) of the same.

As shown in FIG. 3, the weak solution 2 is pumped out of the absorber 22 by the solution pump 24. Midway of the pipeline, a portion of the weak solution 2 is delivered to a solution heat exchanger 27a whereas its remainder is delivered to a solution heat exchanger 27b. The solution heat exchanger 27a is fed from the regenerator 23 acting as the heat source with the condensed water 10, which is circulated to the evaporator 21 after it exchanges the heat with a portion of the weak solution 2. The remaining weak solution 2 exchanges the heat in the solution heat exchanger 27b with the strong solution 4 fed from the regenerator 23, and then joins the weak solution, as fed out of the solution heat exchanger 27a, until it flows together into the regenerator 23.

In this mode, as shown in FIG. 3, one of the pipelines for the weak solution 2 fed from the absorber 22 to be branched into the solution heat exchangers 27a and 27b is equipped with a flow rate regulating throttle valve (or orifice) 25 for regulating the flow rate distribution of the weak solution 2 in accordance with the calorie ratio between the condensed water 10 and the strong solution 4. In this mode, too, the heat cycle is essentially identical to that of FIG. 2, and the performance coefficient is not different from that of the first mode of embodiment.

The first mode of embodiment gives a rather special structure because the solution heat exchanger 27 is one for the three fluids, but the second mode of embodiment can be practiced by arranging the two ordinary solution heat exchangers in parallel.

Figure 5:
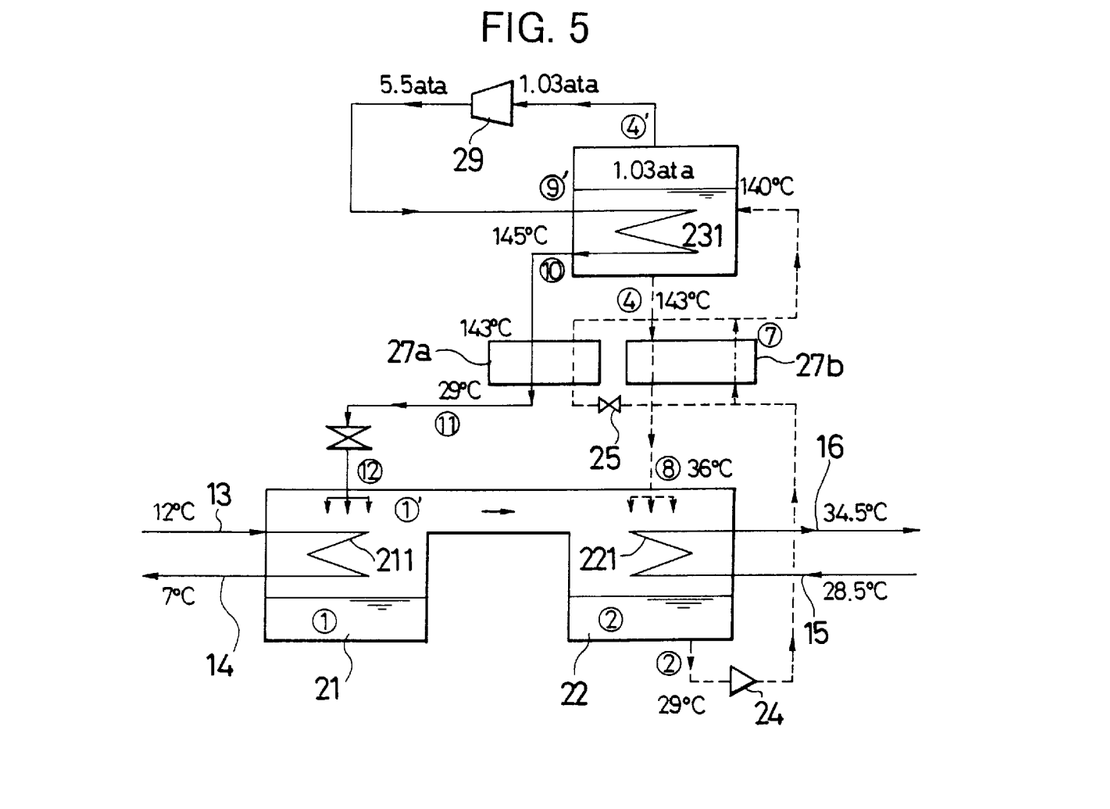
FIG. 5 is a process flow chart showing a third mode of embodiment of the compression/absorption hybrid heat pump according to the invention.
Figure 6:
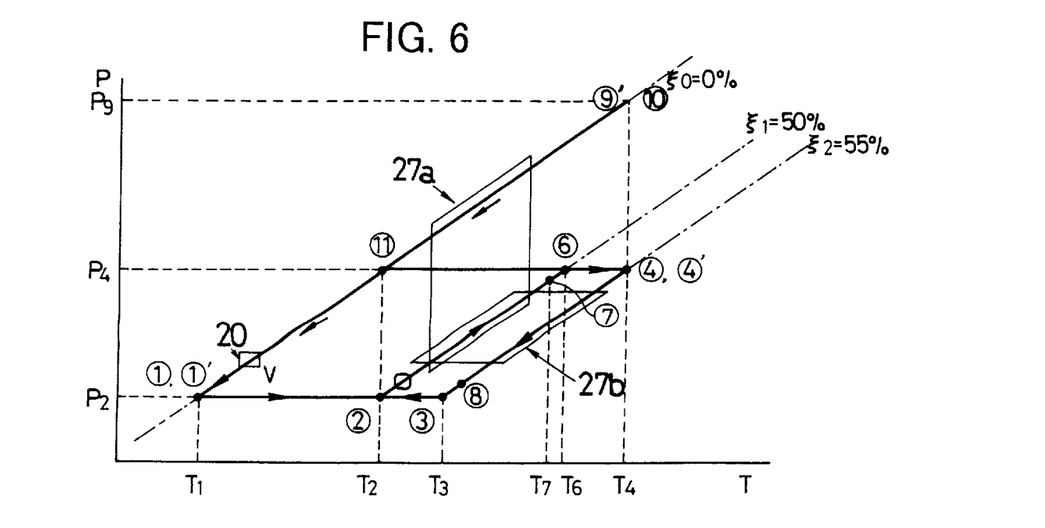
FIG. 6 is a cycle diagram of the compression/absorption hybrid heat pump shown in FIG. 5.

In a third mode of embodiment shown in FIG. 5, on the other hand, the regenerative pressure is taken in the vicinity of the atmospheric pressure. As a result, the density of vapor is ten to twenty times as high as the regenerative pressure (e.g., 50 to 70 mm Hg) of the ordinary absorption cycle so that the compressor 29 can be small-sized. If the regenerative pressure is raised to lower the vapor pressure, however, the difference between the regenerative temperature and the absorptive temperature is drastically enlarged to make it necessary to increase the heat transfer area of the solution heat exchanger. FIG. 6 is a cycle diagram (or a Duehring diagram) of the third embodiment.

The foregoing modes of embodiment have been described on the cooling operations of the compression/absorption hybrid heat pump at a cooling time. The cooling operations can be the more easily realized for the lower concentration of the solution, because the power of the compression/absorption hybrid heat pump for driving the compressor becomes the lower as the compression ratio of the compressor is the lower.

However, this lowering of concentration is limited by the temperature of the cooling water in the absorption process so that a solution of 50% is employed in this mode of embodiment.

At the heating time, on the other hand, the solution concentration has to be higher than at the cooling time, because the heat sink corresponding to the cooling water is at the heating temperature.

Figure 7:
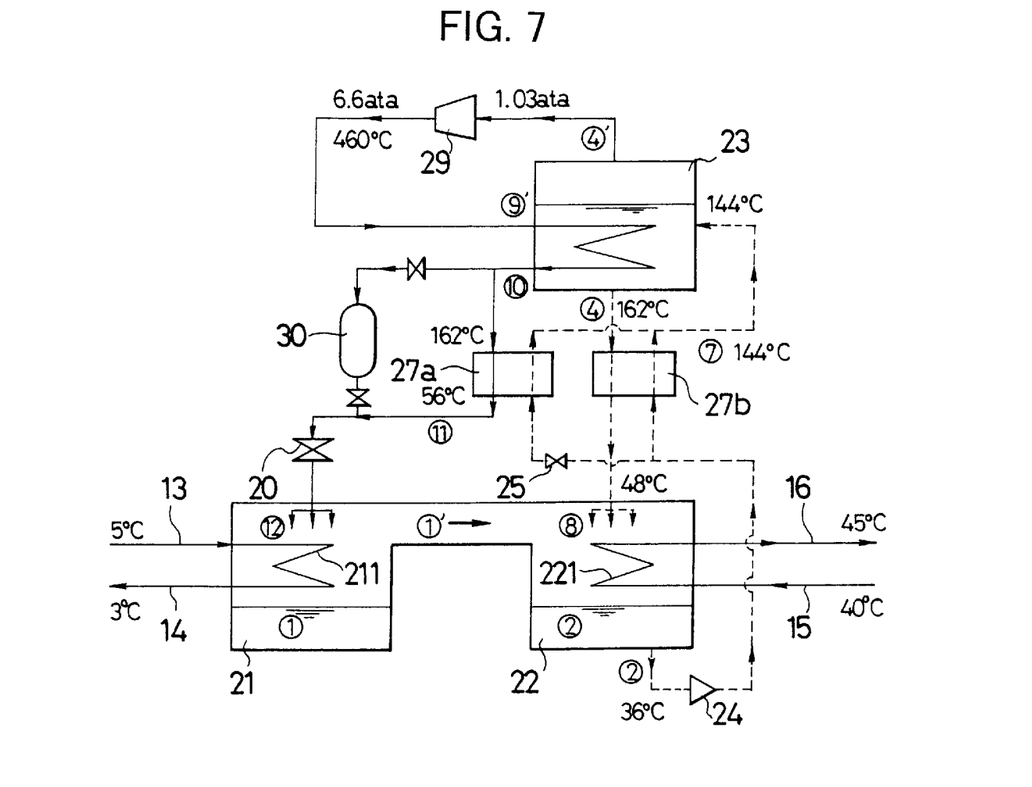
FIG. 7 is a process flow chart showing a fourth mode of embodiment of the compression/absorption hybrid heat pump according to the invention.
Figure 8:
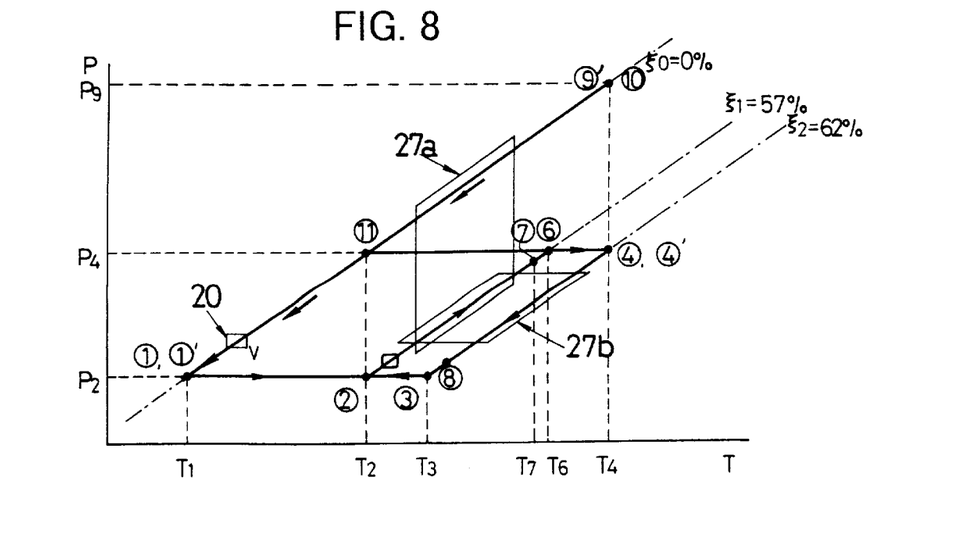
FIG. 8 is a cycle diagram of the compression/absorption hybrid heat pump shown in FIG. 7.

In the fourth mode of embodiment shown in FIG. 7, at the heating time, the condensed refrigerant, as discharged from the regenerator, is partially reserved in a predetermined amount in the refrigerant reserving drum 30. As a result, the refrigerant, as contained in the solution, is partially separated to raise the concentration of the working solution. FIG. 8 is a cycle diagram (or a Duehring diagram) of FIG. 7.

In this mode of embodiment, as illustrated in FIG. 8, the refrigerant of a predetermined volume is reversed in the refrigerant reserving drum 30 at the heating time from the concentration of 50% of the weak solution at the cooling time so that the concentration of the weak solution rises to 50%. As a result, the absorption process can be normally effected even if the temperature of the heat sink rises so that the temperature of the hot water output at the heating time takes 45° C. Considering that the season is winter at the heating time, moreover, the heat source temperature is set at 5° C. By regulating the concentration of the working solution by the refrigerant reserving drum 30, as in the fourth mode of embodiment, not only the cooling but also heating can be performed.

The invention has been described on the application of the VRC to the regenerator of the absorption refrigerating machine which employs the water as its refrigerant and the aqueous solution of LiBr as its absorbent. The absorbent of the absorption refrigerating machine employing the water refrigerant includes not only LiBr but also LiI, LiCl, LiNO$_3$, KBr, NaBr and so on, and their mixtures. The LiBr has high performances and wide uses because of its low corrosivity and high crystallization concentration, and the invention has been described in connection with the embodiments using the LiBr.

No matter what of the materials might be employed, the gist of the invention as the heat pump cycle could be likewise be applied. The invention could cover the embodiments employing the above-specified compounds and their mixtures. Moreover, these absorbents will be collectively called the "aqueous solution of LiBr or the like".

In addition, the invention could be applied to the hybrid combination of the compressor with the absorption refrigerating machine employing ammonia/water, CFC22/E181 as its refrigerant/absorptive solution. For example, the absorption refrigerating machine of the combination of ammonia/water is identical on principle to the compression/absorption hybrid heat pump employing the water as its refrigerant and the aqueous solution of LiBr as its absorbent, as described hereinbefore, although it is different in the provision of an ammonia purifier and in the conditions of working temperature and pressure.

In short, effects similar to those of the invention can be achieved, if the refrigerant vapor, as generated by the regenerator, is compressed by the compressor and is utilized as the heat source for the regenerator and if the heat, as contained in the condensed refrigerant liquid, is then utilized as a portion of the solution, as in the invention.

According to the invention, as described hereinbefore:

1) The heat source for preheating the weak solution in the solution heat exchanger uses the two fluids, the condensed water and the strong solution, so that the preheating temperature of the weak solution can be raised. As a result, the performance coefficient of the compression/absorption hybrid heat pump is drastically improved over that of the prior art.

2) By separating and reserving a portion of the refrigerant in the refrigerant reserving drum at the heating time, the concentration of the working solution is raised at the heating time to a higher value than that at the cooling time so that the compression/absorption hybrid heat pump can be run for both the cooling operations and the heating operations thereby to provide a compression/absorption hybrid heat pump having a high performance coefficient.

What is claimed is:

1. A compression/absorption hybrid heat pump employing a refrigerant and a solution for absorbing the refrigerant, and comprising an evaporator, an absorber, a solution heat exchanger, a regenerator and a compressor as its major components, characterized: in that the vapor generated by the regenerator is compressed by the compressor; in that said compressed vapor is introduced into a heat exchanging portion in the regenerator and is used as a heat source for regenerating the absorbent solution; in that in the solution heat exchanger, the condensed refrigerant liquid, as having released the heat in the regenerator and been condensed, and the strong solution, as fed out of the regenerator, are used as a heat source to preheat the weak solution fed out of the absorber; in that the regenerative pressure is set at a value in the vicinity of atmospheric or above and raises the density of vapor to be generated in the regenerator: and in that any insufficiency in calories by the compressor are made up for by either one of an auxiliary heating means in the regenerator and an auxiliary preheating means between the regenerator and the solution heat exchanger.

2. A compression/absorption hybrid heat pump as set forth in claim 1, characterized: in that a bypass is provided between the regenerator and the evaporator via said solution heat exchanger, bypassing the solution heat exchanger, a portion of the condensed refrigerant, as fed out of the regenerator, is introduced and stored into a refrigerant reserving drum so that it is reserved in a predetermined amount during heating operations, the refrigerant reserving drum being in the bypass, and the predetermined amount is sent out from the refrigerant reserving drum into the evaporator during cooling operations, whereby the concentration of the working solution is increased to raise the cooling of the absorbent liquid so that the cooling heat of the absorber may be used for heating operations and during cooling operations, the concentration of the working solution is returned to an original value.

* * * * *

UNITED STATES PATENT AND TRADEMARK OFFICE
CERTIFICATE OF CORRECTION

PATENT NO. : 5,934,101
DATED : August 10, 1999
INVENTOR(S) : Takaki et al.

It is certified that error appears in the above-identified patent and that said Letters Patent is hereby corrected as shown below:

Title page,
Item [54], please delete ("COMPRESSION ABSORPTION HEAT PUMP")
and insert -- COMPRESSION/ABSORPTION HYBRID HEAT PUMP --

Column 4,
Line 24, delete "(not-shown)";
Line 24, after "device" insert -- 232 --;
Line 25, delete "(not-shown)"; and after "preheater" insert -- 233 --.

Signed and Sealed this

Second Day of April, 2002

Attest:

JAMES E. ROGAN
Attesting Officer     Director of the United States Patent and Trademark Office